United States Patent
Baker et al.

(10) Patent No.: US 11,887,116 B1
(45) Date of Patent: Jan. 30, 2024

(54) ORIENTATION SENSOR-ENABLED AUTHENTICATION

(71) Applicant: United Services Automobile Association (USAA), San Antonio, TX (US)

(72) Inventors: Kelly Q. Baker, San Antonio, TX (US); David M. Jones, Jr., San Antonio, TX (US); Robert Andrew Massie, San Antonio, TX (US); Bryan J. Osterkamp, New Braunfels, TX (US); Ryan Thomas Russell, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/103,110

(22) Filed: Nov. 24, 2020

Related U.S. Application Data

(60) Provisional application No. 62/939,911, filed on Nov. 25, 2019.

(51) Int. Cl.
| | |
|---|---|
| *G06Q 20/00* | (2012.01) |
| *G06Q 20/40* | (2012.01) |
| *H04L 9/40* | (2022.01) |
| *G06Q 20/34* | (2012.01) |
| *G06Q 20/02* | (2012.01) |

(Continued)

(52) U.S. Cl.
CPC ......... *G06Q 20/40* (2013.01); *G06K 19/0719* (2013.01); *G06Q 20/02* (2013.01); *G06Q 20/202* (2013.01); *G06Q 20/204* (2013.01); *G06Q 20/321* (2020.05); *G06Q 20/3226* (2013.01); *G06Q 20/341* (2013.01); *H04L 63/0853* (2013.01); *G06Q 30/0185* (2013.01)

(58) Field of Classification Search
CPC ........... G06K 19/0719; G06K 19/0723; G06K 9/00355; G06Q 20/40; G06Q 20/321; G06Q 20/38; G06Q 20/20; G06Q 20/34; H04W 4/80; H04W 12/06; H04B 5/02; H04B 5/00
See application file for complete search history.

(56) References Cited

U.S. PATENT DOCUMENTS

| | | | |
|---|---|---|---|
| 7,259,710 B2 * | 8/2007 | Kisliakov | G06F 1/1684 711/115 |
| 8,761,809 B2 * | 6/2014 | Faith | G06Q 20/389 455/406 |

(Continued)

*Primary Examiner* — Florian M Zeender
*Assistant Examiner* — Milena Racic
(74) *Attorney, Agent, or Firm* — Fletcher Yoder P.C.

(57) ABSTRACT

Authentication systems and methods using orientation sensor-enabled payment cards are disclosed herein where a server receives an authorization request from a web server or an electronic terminal. The server then transmits an instruction to the orientation sensor to determine whether the payment card has an orientation that is consistent with a predetermined orientation. When the payment card has an orientation consistent with the predetermined orientation, the server executes a first authentication protocol. However, if the payment card has an orientation that is not consistent with the predetermined orientation, the server executes a second authentication protocol that is more restrictive than the first authentication protocol.

20 Claims, 8 Drawing Sheets

(51) Int. Cl.
*G06Q 20/32* (2012.01)
*G06Q 20/20* (2012.01)
*G06K 19/07* (2006.01)
G06Q 30/018 (2023.01)

(56) References Cited

U.S. PATENT DOCUMENTS

| | | | | |
|---|---|---|---|---|
| 9,170,318 | B1* | 10/2015 | Bozarth | H04W 4/026 |
| 9,483,763 | B2* | 11/2016 | Van Os | G06Q 20/3223 |
| 9,628,958 | B1* | 4/2017 | McBurney | H04W 4/027 |
| 9,892,405 | B2* | 2/2018 | Olson | G07F 7/0833 |
| 10,108,827 | B1* | 10/2018 | Wurmfeld | G06Q 20/352 |
| 10,484,384 | B2* | 11/2019 | Cotterill | H04W 12/06 |
| 10,515,350 | B2* | 12/2019 | Kattimani | H04W 4/023 |
| 10,521,579 | B2* | 12/2019 | Van Os | H04L 9/3231 |
| 10,713,644 | B2* | 7/2020 | Dragushan | G06Q 20/202 |
| 11,170,085 | B2* | 11/2021 | Devine | G06F 21/32 |
| 11,182,814 | B1* | 11/2021 | Clem | G06Q 30/0205 |
| 11,403,606 | B2* | 8/2022 | Li | G06Q 20/3223 |
| 11,460,882 | B2* | 10/2022 | Ro | G06F 3/0483 |
| 11,570,309 | B2* | 1/2023 | Raleigh | H04M 15/723 |
| 2012/0220221 | A1* | 8/2012 | Moosavi | H04M 1/2757 |
| | | | | 455/41.1 |
| 2014/0099886 | A1* | 4/2014 | Monroe | G06F 3/0487 |
| | | | | 455/41.1 |
| 2017/0154328 | A1* | 6/2017 | Zarakas | G06Q 20/204 |
| 2017/0323166 | A1* | 11/2017 | Colussi | G06K 9/00335 |
| 2018/0323166 | A1* | 11/2018 | Hasegawa | H01L 24/78 |
| 2019/0213581 | A1* | 7/2019 | Zarakas | G06F 3/017 |
| 2021/0383355 | A1* | 12/2021 | Pinniboyina | G06V 40/28 |

* cited by examiner

ORIENTATION SENSOR-ENABLED AUTHENTICATION

CROSS-REFERENCE TO RELATED APPLICATION

The present disclosure is related to, and claims priority to, U.S. Provisional Patent Application Ser. No. 62/939,911, titled "Orientation-Sensor-Enabled Authentication," which was filed on Nov. 25, 2019, and which is herein incorporated by reference in its entirety for all purposes.

BACKGROUND

The present disclosure relates generally to authentication systems and methods for authorizing electronic transactions and, more particularly, to systems and methods for authorizing payments based on orientations of payment cards.

With the emergence of electronic commerce, consumers are increasingly purchasing products and services using cashless payment methods, such as credit cards, debit cards, and so forth. Conventional authentication methods rely on matching a credit card number with a cardholder's account number and determining whether the transaction is authorized. Some conventional authentication methods also rely on authentication protocols, such as entering a pin code at a point of sale (POS) terminal or while shopping online. Conventional authentication methods are relatively static and have become outdated. As a result, a cyber attacker may spoof a user's payment information (e.g., credit card number or CVV) or may have unauthorized access to a cardholder's pin code. Using this information, a cyber attacker may easily facilitate an unauthorized transaction. Therefore, conventional authentication methods are inadequate and outdated.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

For the aforementioned reasons, there is a desire to reduce risk of fraudulent activity associated with electronic transactions. In particular, there is a desire for a new software solution to automatically and securely authenticate a user and authorize a transaction without interfering with the flow of data. For example, in certain embodiments, to authenticate a user conducting a transaction using a payment card, a central server may transmit an activating signal to an orientation sensor integrated into the payment card. Based on an orientation of the payment card, the central server may execute various authentication protocols. For example, in certain embodiments, the central server may display a prompt on an electronic device (e.g., cellular phone) of the user asking the user to input a passcode if the central server determines that the payment card is in the user's pocket, but simultaneously being used at a point of sale (POS) terminal. Disclosed herein are systems and methods capable of addressing the technical shortcomings described above. The systems and methods described herein may also provide any number of additional or alternative benefits and advantages. As described in greater detail herein, embodiments of the present disclosure relate to systems, apparatuses, methods, and computer program products for authenticating electronic transactions.

In an embodiment, a method includes receiving, via a server, a request to authorize a payment associated with a payment card. The method also includes transmitting, via the server, an instruction to an orientation tracking module of the payment card to determine an orientation of the payment card and to transmit a signal corresponding to the determined orientation to the server. The method further includes receiving, via the server, the determined orientation of the payment card from the orientation tracking module of the payment card. In addition, the method includes executing, via the server, an authentication protocol based on the determined orientation of the payment card.

In another embodiment, a server includes at least one processor configured to execute processor-executable instructions stored on at least one non-transitory machine-readable storage medium of the server. The processor-executable instructions, when executed by the at least one processor, cause the server to receive a request to authorize a payment associated with a payment card. The processor-executable instructions, when executed by the at least one processor, also cause the server to transmit an instruction to an orientation tracking module of the payment card to determine an orientation of the payment card and to transmit a signal corresponding to the determined orientation to the server. The processor-executable instructions, when executed by the at least one processor, further cause the server to receive the determined orientation of the payment card from the orientation tracking module of the payment card. In addition, the processor-executable instructions, when executed by the at least one processor, cause the server to execute an authentication protocol based on the determined orientation of the payment card.

In another embodiment, a payment card includes an orientation tracking module that includes an orientation tracking sensor configured to determine an orientation of the payment card, and a transmitter/receiver configured to transmit a signal corresponding to the determined orientation to a server to authorize a payment associated with the payment card.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure are directed to authentication systems and methods using orientation sensor-enabled payment cards where a server receives an authorization request from a web server or an electronic terminal. The server then transmits an instruction to the orientation sensor to determine whether the payment card has an orientation that is consistent with a predetermined orientation. When the payment card has an orientation consistent with the predetermined orientation, the server executes a first authentication protocol. However, if the payment card has an orientation that is not consistent with the predetermined orientation, the server executes a second authentication protocol that is more restrictive than the first authentication protocol.

Figure 1:
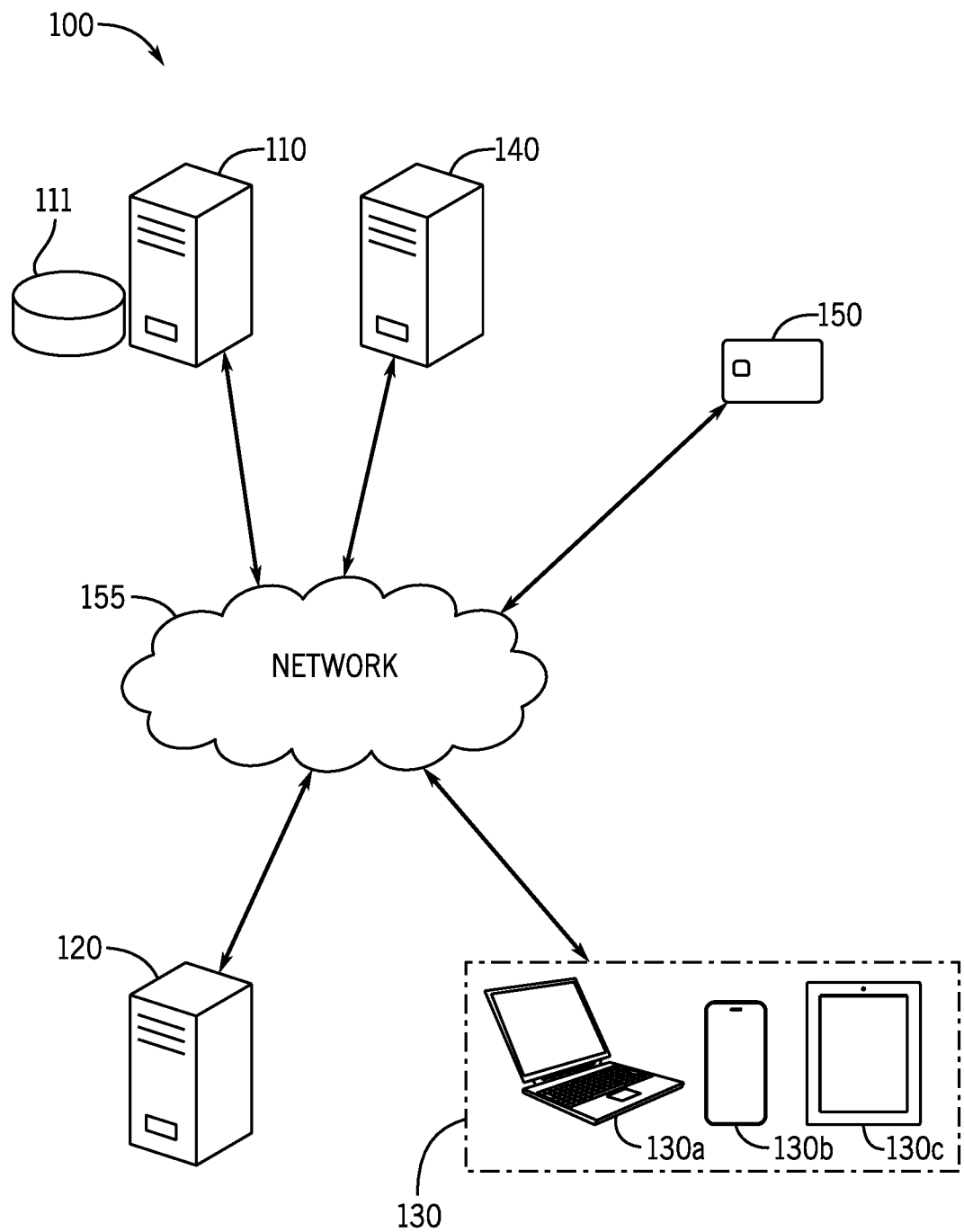
FIG. 1 illustrates components of a payment system for orientation sensor-enabled authentication, in accordance with embodiments described herein.

FIG. 1 illustrates components of a payment system 100 for orientation sensor-enabled authentication. The payment system 100 may include an analytics server 110, a database 111, a payment facilitation server 120, one or more electronic user devices 130a-c (referred to collectively herein as electronic user devices 130), a web server 140, and a payment card 150. In certain embodiments, the analytics server 110, the database 111, the payment facilitation server 120, the electronic user devices 130, the web server 140, and the payment card 150 may be communicatively connected to each other through a network 155, which may include, but is not limited to, a private or public local area network (LAN), a wireless local area network (WLAN), a metropolitan area network (MAN), a wide rea network (WAN), the Internet, and so forth. The network 155 may include both wired and wireless communications according to one or more standards and/or via one or more transport mediums. The communication over the network 155 may be performed in accordance with various communication protocols such as Transmission Control Protocol and Internet Protocol (TCP/IP), User Datagram Protocol (UDP), and Institute of Electrical and Electronics Engineers (IEEE) communication protocols. For example, in certain embodiments, the network 155 may include wireless communications according to Bluetooth specification sets, or another standard or proprietary wireless communication protocol. In other embodiments the network 155 may also include communications over a cellular network, including, a GSM (Global System for Mobile Communications), CDMA (Code Division Multiple Access), and EDGE (Enhanced Data for Global Evolution) network, for example.

The analytics server 110 may be any computing device that includes at least one processor and at least one non-transitory machine-readable storage medium capable of collectively executing the various tasks and processes described herein. Non-limiting examples of such computing devices may include workstation computers, laptop computers, server computers, laptop computers, and so forth. While the payment system 100 illustrated in FIG. 1 includes a single analytics server 110, one having skill in the art would appreciate that, in other embodiments, the analytics server 110 may include any number of computing devices operating in a distributed computing environment.

As will be described in greater detail herein, the analytics server 110 may be operatively connected (or otherwise in communication with) the database 111. The analytics server 110 may communicate with the database 111 to retrieve user data. For example, in certain embodiments, the analytics server 110 may retrieve identification of an electronic user device 130 associated with the payment card 150. In certain embodiments, the analytics server 110 may also retrieve a unique identifier of an orientation tracking sensor integrated into the payment card 150. In certain embodiments, the analytics server 110 may also retrieve a profile of the user to match a pin code received (from the electronic user device 130 purporting to be operated by the user) with a pin code known to be associated with the user to authorize the transaction. As described in greater detail herein, the analytics server 110 may be in communication with all the computing features/devices illustrated in FIG. 1 to authenticate the user and authorize a transaction involving the payment card 150.

The database 111 may be capable of storing user profiles containing demographic data relating to users, electronic user devices 130 (also referred to as authorized user devices) associated with users, payment information, payment card information, authentication passcodes, authentication preferences, and so forth. In certain embodiments, the database 111 may be in communication with a processor of the analytics server 110 and/or of the electronic user devices 130, where the processor is capable of executing the various commands (e.g., processor-executable instructions) of the payment system 100. In certain embodiments, the database 111 may be part of the analytics server 110 or the electronic user devices 130. In certain embodiments, the database 111 may be a separate computing feature/component in communication with the analytics server 110. In certain embodiments, the database 111 may be a part of the analytics server 110.

In certain embodiments, the database 111 may be hosted on any number of computing devices including a non-transitory machine-readable storage medium and capable of performing the various tasks described herein. As illustrated in FIG. 1, the database 111 may be accessed by the analytics server 110, the electronic user devices 130, and/or other servers/devices of the payment system 100 via the network 155. In certain embodiments, the database 111 may be hosted on the same physical computing device functioning as the analytics server 110 and/or the electronic user devices 130. In certain embodiments, the database 111 may include a logical construct of data files that are stored in non-transitory machine-readable storage media, such as a hard disk or memory, controlled by software modules of a database program (for example, structured query language (SQL)), and a related database management system (DBMS) that executes the code modules (for example, SQL scripts) for various data queries and other management functions generated by the analytics server 110.

The payment facilitation server 120 may be any computing device connected to a financial institution associated with the payment card 150. In a non-limiting example, the payment facilitation server 120 may be a bank server. The payment facilitation server 120 may receive transaction data (e.g., payment card information and/or payment amount) and may retrieve an account associated with the payment card 150. The payment facilitation server 120 may then determine whether debiting the payment amount from the identified account is authorized for the transaction. For example, the payment facilitation server 120 may determine that a $1,000 transaction is not authorized because the cardholder (associated with the payment card 150) does not have a credit limit that can enable a $1,000 transaction.

The electronic user devices 130 may be any portable or non-portable device, such as a desktop computer, laptop computer, tablet computer, smart phone, smart watch, gaming console, personal digital assistant, and so forth. The electronic user devices 130 may be any computer with a processor/microcontroller and/or any other electronic component that performs one or more operations according to one or more programming instructions (e.g., processor-executable instructions). The electronic user devices 130 may be capable of communicating with the analytics server 110 (e.g., directly or through an application installed on the electronic user devices 130) through the network 155 using wired or wireless communication capabilities.

In certain embodiments, the electronic user devices 130 may be in communication with (or include) an orientation sensor reader configured to monitor orientation data received via various orientation sensors, for example, an orientation sensor of the payment card 150. In certain embodiments, the orientation sensor reader of the electronic user devices 130 may interrogate all orientation sensors within a predetermined proximity of the electronic user devices 130. For example, in certain embodiments, the orientation sensor reader (e.g., an application installed onto an electronic user device 130) may broadcast an activation signal to all orientation sensors within a predetermined proximity (e.g., five feet) of the orientation sensor reader. Upon receiving the activation signal, different orientation sensors may then identify an orientation of a corresponding item (e.g., including a payment card 150) and transmit the orientation data back to the orientation sensor reader.

In certain embodiments, the electronic user devices 130 may be a specifically designed electronic device to implement a secure transaction, as described in greater detail herein. For example, in certain embodiments, the electronic user devices 130 may include an electronic device designed for authenticating payments with the payment card 150. For example, in certain embodiments, the electronic user devices 130 may be a wearable device and/or smart watch, and an orientation sensor module may be embedded into the wearable device and/or the smart watch. In other embodiments, the electronic user devices 130 may be devices that are used and repurposed to perform the functionality described herein. For example, the electronic user device 130*b* may be a smart phone that may be used for purposes other than the functionality described herein (e.g., browsing the web, telephonic communication, text messaging, navigation, and so forth). However, the electronic user device 130*b* may also be repurposed (e.g., enabled with an orientation sensor transmitter/reader) to perform the techniques described herein.

In certain embodiments, the web server 140 may be any computing device hosting a website of a merchant via the network 155. Upon navigating to a webpage of the website using a browser application executing on an electronic user device 130, the analytics server 110 may track activity of a user associated with the electronic user device 130 on the webpage. The analytics server 110 may also execute a browser extension on the electronic user device 130 where the browser application may or may not be executing as a background process.

Accordingly, in operation, users may use the electronic user devices 130 to access a webpage on a web application (e.g., browser application) installed on the electronic user devices 130. The webpage may correspond to (e.g., be a part of) a website of a particular merchant. In certain embodiments, the web server 140 may host the webpage for the web merchant. Therefore, the web server 140 may be directly or indirectly associated with the web merchant from which the users are requesting products or services. In certain embodiments, the web merchant may operate the web server 140. In other embodiments, the web server 140 may be a third party sever associated with the web merchant where the web server 140 is configured to host/manage the website of the web merchant (e.g., receive payment information from users and process requests and transactions).

Even though the systems and methods described herein include embodiments where a payment request is transmitted as a result of a user interacting with the web server 140, in other embodiments, the systems and methods described herein may be implemented using a point of sale (POS) terminal. The POS terminal may be any electronic terminal and/or computing device configured to acquire payment card identifier from a payment card 150. The POS terminal may use a variety of existing methods such as a magnetic stripe located within or attached to the payment card 150 and/or near field communication (NFC) to acquire payment information from a payment card 150 (e.g., credit card, debit card, and so forth) or other electronic payment methods (e.g., NFC enabled wearable payment devices).

In certain embodiments, the POS terminal may acquire payment information (e.g., unique payment number or credit card number) of a user and transmit the payment information along with an authorization request to a server, such as the analytics server 110 or the payment facilitation server 120. The payment facilitation server 120 may then retrieve the payment information received from the POS terminal and authorize (or deny) payment to the user. The payment card 150 may be any card that is enabled with an orientation module (e.g., sensor chip). Embodiments of the payment card 150 are illustrated in FIGS. 2A-2C.

Figure 2A:
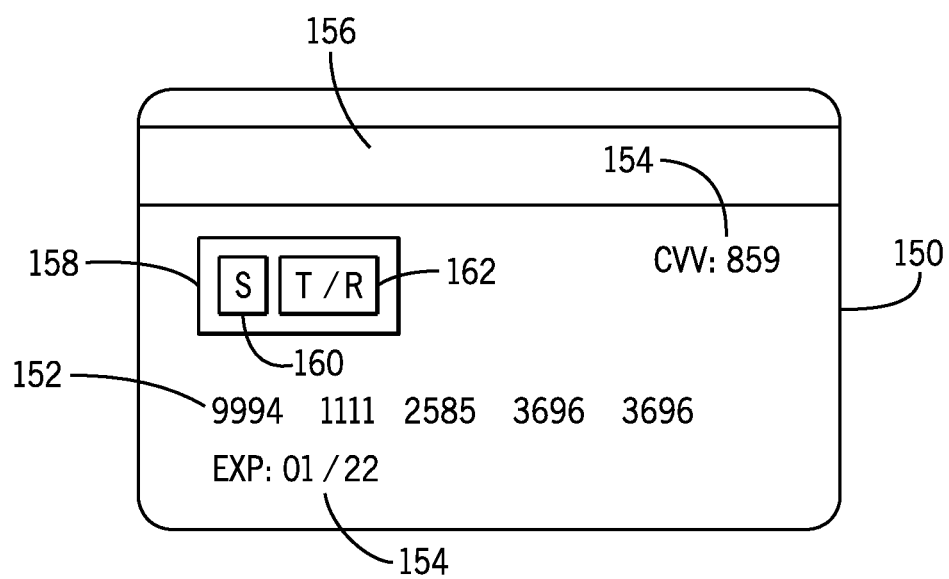
FIGS. 2A-C illustrate non-limiting examples of orientation sensor-enabled payment cards, in accordance with embodiments described herein.
Figure 2B:
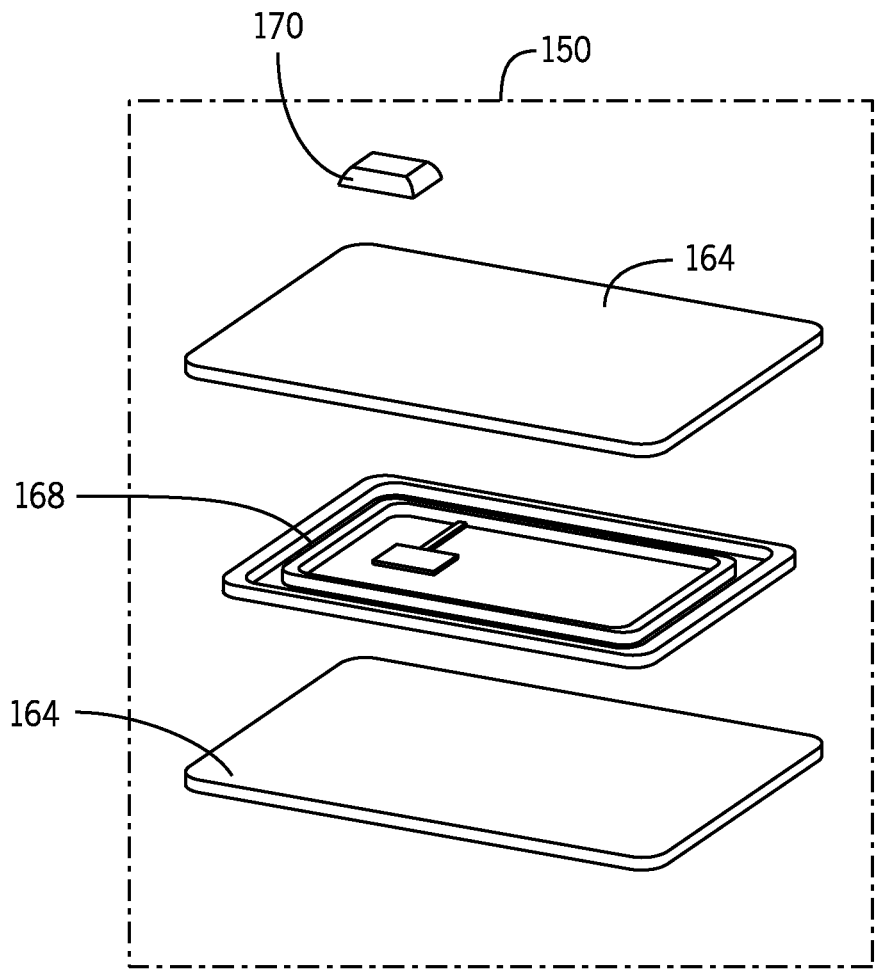
Figure 2C:
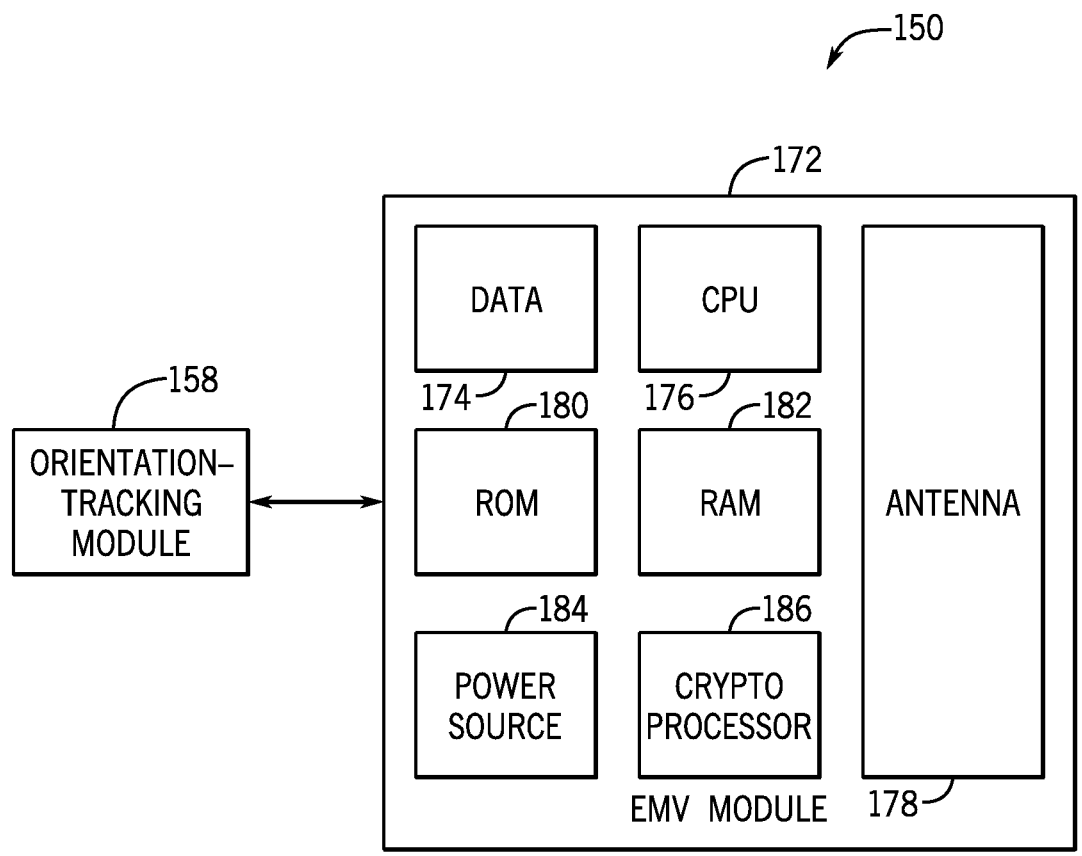

As illustrated in FIG. 2A, the payment card 150 may be a part of the payment system 100 of FIG. 1, and may be issued by financial institutions (e.g., bank, credit card issuer, payment facilitation server 120, and/or the analytics server 110 as described in FIG. 1) to a user. The payment card 150 may enable a user to access funds in his or her bank account or line of credit associated with a particular financial institution. For example, the payment card 150 may be electronically linked to an account or accounts belonging to the user. In certain embodiments, these accounts may be hosted and/or operated by the payment facilitation server 120 and/or the analytics server 110. These accounts may be deposit accounts, loan, or credit accounts, and the payment card 150 may be utilized for accessing those funds.

As illustrated in FIG. 2A, the payment card 150 may include a unique payment/card number 152 and other security information 154, such as an expiration date or card verification value (CVV). In certain embodiments, this unique payment information may be embedded within a magnetic stripe 156 on the back of the payment card 150 enabling various machines (e.g., POS terminal) to read and access the payment information. The magnetic stripe 156 of the payment card 150 may be capable of storing data (e.g., an account number for the user) by modifying the magnetism of iron-based magnetic particles on a band of magnetic material of the payment card 150. The magnetic stripe 156 may interact with a magnetic reading head of a POS terminal to convey the payment information to the POS terminal. For example, when the payment card 150 is placed near the POS terminal, a magnetic reading head of the POS terminal may retrieve payment information relating to the payment card 150, such as the account number for the user or other unique identifiers linked to an account of the user operating the payment card 150.

The payment card 150 may also include an orientation tracking module 158, which may include an orientation tracking sensor 160 and a transmitter/receiver 162 integrated into the payment card 150. In certain embodiments, the orientation tracking module 158 may be retroactively attached to the payment card 150. In certain embodiments, the orientation tracking module 158 may also be embedded within the payment card 150, as illustrated in FIG. 2B, which shows a non-limiting example of the payment card 150 having multiple layers. For example, as illustrated in FIG. 2B, in certain embodiments, card body layers 164, 166 of the payment card 150 may include any polycarbonate bodies designed to protect the orientation tracking module 158 including an antenna layer 168 (e.g., the transmitter/receiver 162) disposed between the card body layers 164 and an orientation tracking chip 170 (e.g., including the orientation tracking sensor 160). In certain embodiments, the body layers 164, 166 may be printed with promotional or other bank-specific material/logos. As illustrated in FIG. 2B, in certain embodiments, the orientation tracking chip 170 may include an orientation tracking chip attached to an outer portion of the card body layer 164. Furthermore, in certain embodiments, the antenna layer 168 may include an integrated circuit, which may be placed between the card body layers 164, 166 and from which data associated with an orientation of the payment card 150 may be broadcasted. In certain embodiments, the various components of the the orientation tracking module 158 illustrated in FIGS. 2A and 2B may be embedded within the payment card 150 during the production of the payment card 150.

In operation, the analytics server 110 may transmit an activation signal to the orientation tracking chip 170 (e.g., received via the local transmitter/receiver 162 (e.g., the antenna layer 168)) and the orientation tracking sensor 160 incorporated therein may determine an orientation of the payment card 150. The orientation tracking module 158 may then use the local transmitter/receiver 162 (e.g., the antenna layer 168) to transmit the determined orientation to the analytics server 110. In certain embodiments, the orientation tracking chip 170 may use a network (such as the network 155 in FIG. 1) to transmit orientation data to the analytics server 110. Additionally or alternatively, in certain embodiments, the orientation tracking module 158 may use its local transmitter/receiver 162 (e.g., the antenna layer 168) to transmit the orientation data, such that an electronic user device (e.g., of the electronic user devices 130 in FIG. 1) may receive the orientation data and then transmit the orientation data to the analytics server 110.

In certain embodiments, the orientation tracking module 158 described herein may be integrated into other authorization and/or authentication devices. For example, in certain embodiments, a payment card 150 may be enabled with an EMV (Europay, MasterCard, and Visa) module. As illustrated in FIG. 2C, the orientation tracking capabilities described herein may be integrated into and/or work in conjunction with an EMV chip functionality. An EMV module 172 of the payment card 150 may include an EMV chip that may store data on one or more integrated circuits in addition to magnetic stripes (for backward compatibility). The EMV chip may authenticate the cardholder when the payment card 150 is physically inserted into a reader (e.g., POS terminal), as well as when the payment card 150 may be read over a short distance using near-field communication (NFC) technology. The EMV module 172 of a payment card 150 may include various sub modules. For example, the EMV module 172 may also include a printed or etched integrated circuit with multiple layers (e.g., data, application, operating system, input/output systems, and hardware). These layers may work together to authenticate the cardholder. For example, in certain embodiments, the orientation tracking module 158 of the payment card 150 may utilize its power from circuitry enabling the EMV module 172. For example, the orientation tracking module 158 may share or partially use the same integrated circuit used by the EMV module 172. In certain embodiments, the orientation tracking module 158 may integrate with one or more sub-modules (e.g., stored data 174, CPU 176, antenna 178, ROM 180, RAM 182, power source 184, and/or crypto processor 186) of the EMV module 172 to retrieve a unique identifier or other payment information and broadcast the data retrieved in accordance with the methods described in greater detail herein.

Figure 3:
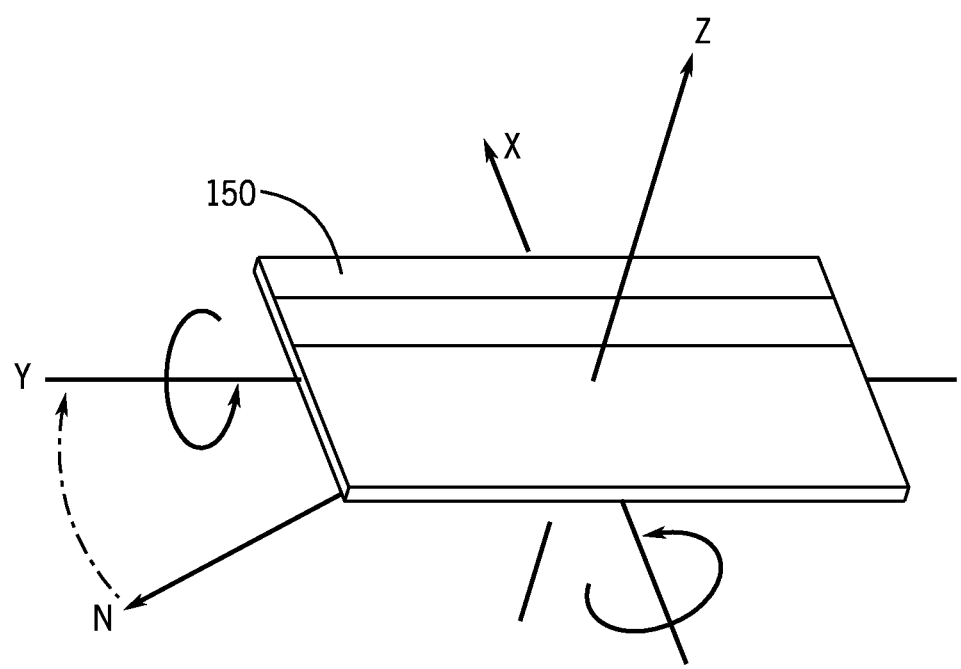
FIG. 3 illustrates a non-limiting example of operation of an orientation sensor of a payment card, in accordance with embodiments described herein.

FIG. 3 illustrates a non-limiting example of operation of an orientation tracking sensor 160 of a payment card 150. As described in greater detail herein, the orientation tracking sensor 160 may be any orientation or position-tracking sensor capable of tracking orientation, movement, acceleration, and so forth, of the payment card 150 with which the orientation tracking sensor 160 is integrated. Therefore, the orientation tracking sensor 160 is not limited to only tracking a positional angle of the payment card 150 described herein.

In certain embodiments, the orientation tracking sensor 160 may include an inertial measurement unit (IMU) sensor. An IMU sensor is an electronic sensor that measures and reports an item's specific force, angular rate, and/or the orientation of the item, using a combination of accelerometers, gyroscopes, and/or magnetometers. The IMU sensor may detect linear acceleration of an item (e.g., payment card) using one or more accelerometers and rotational rate using one or more gyroscopes. Typical configuration of an IMU sensor may include one accelerometer, gyroscope, and/or magnetometer per axis (e.g., the x-axis, the y-axis, and the z-axis illustrated in FIG. 3). In certain embodiments, the orientation tracking sensor 160 may include an attitude and heading reference system (AHRS) to identify attitude information (e.g., magnetic, angular rate, gravity pitch, and yaw) for the payment card 150. Additionally or alternatively, in certain embodiments, the orientation tracking sensor 160 may include an inertial navigation system (INS) and/or a velocity sensor to monitor the direction and speed of movement of the payment card 150. In certain embodiments, an INS may also be supplemented by a barometric (or digital) altimeter and/or by magnetic sensors (magnetometers) and/or speed measuring devices. To identify how the payment card 150 is positioned/oriented and how the payment card 150 is moving, if at all. As illustrated in FIG. 3, an orientation tracking sensor 160 embedded within the payment card 150 may indicate a positional and/or rotational angle or a movement (and its relative speed) of the payment card 150 in each axis (e.g., the x-axis, the y-axis, and the z-axis).

Figure 4:
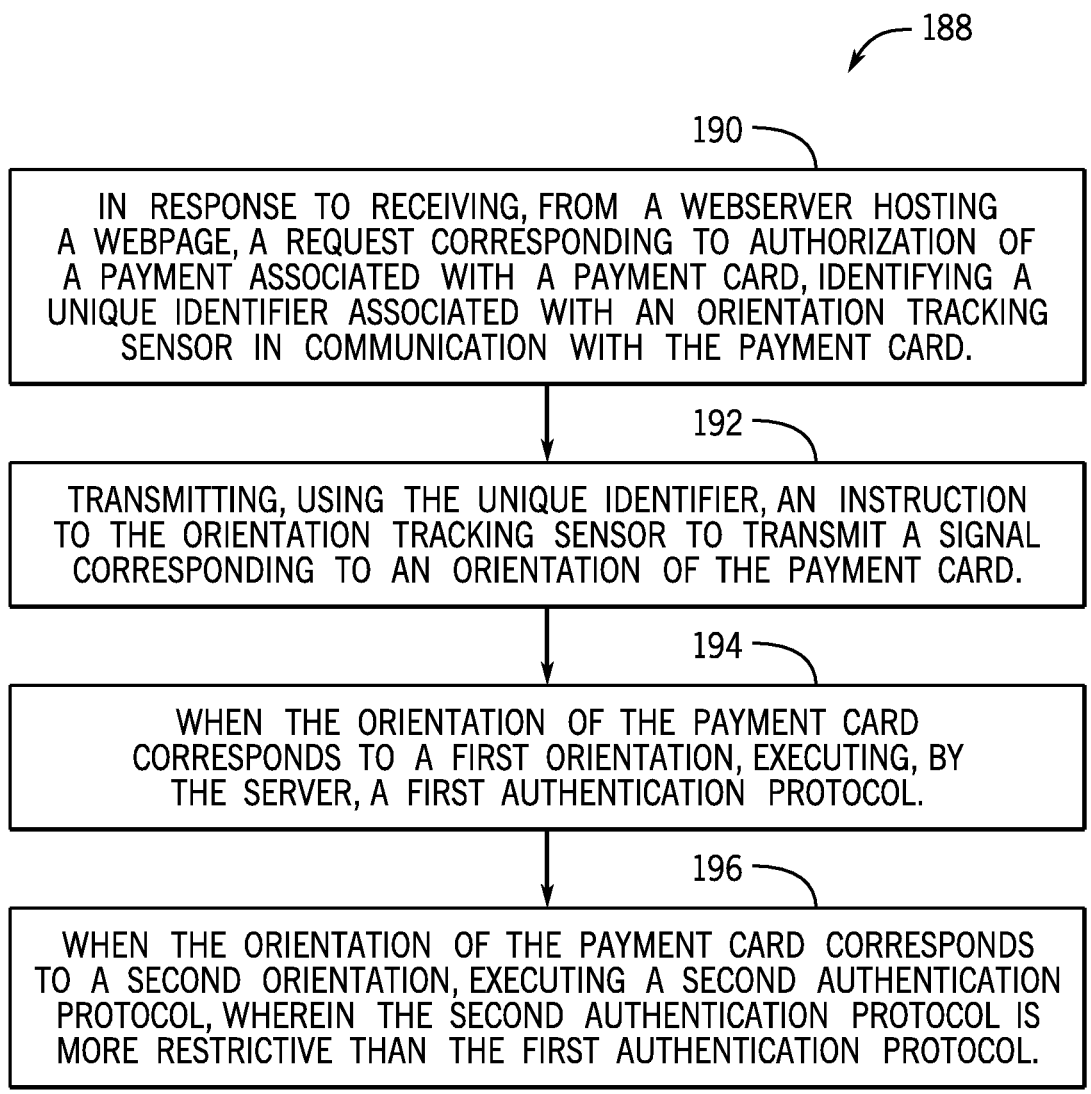
FIG. 4 is a flow diagram of an illustrative process/method for orientation-sensor-enabled authentication, in accordance with embodiments described herein.

FIG. 4 illustrates execution steps of a method 188 for orientation sensor-enabled authentication and/or authorization. In certain embodiments, the method 188 includes execution steps 190, 192, 194, 196. However, other embodiments may include additional or alternative execution steps, or may omit one or more steps altogether. Other embodiments may perform certain execution steps in a different order and/or steps may also be performed simultaneously or near-simultaneously with one another. The method 188 is primarily described herein as being executed by a single analytics server 110 computer. However, in certain embodiments, various steps may be executed by any number of computing devices operating in a distributed computing environment. In certain embodiments, a computer executing one or more steps may be programmed to execute various other unrelated features where such computer does not need to be operating strictly as the analytics server 110 described herein. Furthermore, each step and embodiment described herein may be combined with other steps and embodiments.

At step 190, in response to receiving, from a web server 140 hosting a webpage, a request corresponding to authorization of a payment associated with a payment card 150, the analytics server 110 may identify a unique identifier associated with an orientation tracking sensor 160 (and/or the orientation tracking module 158) in communication with (e.g., integrated within, as described herein) the payment card 150. In other words, the analytics server 110 may receive a payment authorization request from a web server 140. As described in greater detail herein, a user may use an electronic user device 130 to execute a browser application and navigate through various merchant websites. In certain embodiments, an online shopping website may receive a cardholder's payment information and transmit a payment authorization request to the analytics server 110.

In certain embodiments, the analytics server 110 may receive the payment authorization request from an electronic terminal. As described in greater detail herein, an electronic terminal may be any terminal configured to facilitate a transaction by receiving payment information from a payment card 150 and authenticating the cardholder's payment information. Electronic terminals are not limited to POS systems. In certain embodiments, an electronic user device 130 (e.g., smart phone) may be configured or retrofitted to facilitate a transaction similar to a POS terminal. For example, software and/or hardware may be installed on a mobile phone (e.g., electronic user device 130) that enable the mobile phone with the same functionality as a POS terminal. In certain embodiments, the request may be received from a server connected to a POS terminal. For example, a server operatively connected to a POS terminal or the mobile device (e.g., electronic user device 130) acting as a POS terminal may transmit the request to the analytics server 110.

As described in greater detail herein, the payment card 150 may be any card enabled with an orientation tracking sensor 160. For example, the payment card 150 may be a credit card, debit card, or any other card that has an orientation tracking sensor 160 integrated therein. As described in greater detail herein, the orientation tracking sensor 160 may be configured to transmit orientation data associated with the payment card 150. In addition, in certain embodiments, the orientation tracking sensor 160 may have a unique number, for example, stored in a dataset (e.g., in a database 111) accessible to the analytics server 110. The unique number may be any collection of characters (e.g., alphanumerical value, in certain embodiments) unique to the payment card 150 and/or the orientation tracking sensor 160 of the payment card 150. As such, the analytics server 110 may identify an orientation of the payment card 150 by activating/interrogating the orientation tracking sensor 160 of the payment card 150 based on the unique number associated with the payment card 150 and/or the orientation tracking sensor 160 of the payment card 150.

The payment authorization request may include payment information of a payment card 150. Payment information may be any identification information that the web server 140 and/or electronic terminal (e.g., POS terminal) retrieves from the payment card 150. Non-limiting examples of payment information may include a payment card number, an account number, or any other number that corresponds to the cardholder's financial account.

In a non-limiting example, a cardholder initiates a payment by navigating to a merchant's website and entering his/her payment information into various input elements displayed via the website. As a result, the web server 140 hosting the merchant's website may then generate a request to authenticate the user and authorize the payment. The web server 140 may then transmit the request to the analytics server 110. The request may include the payment card number, a time stamp of the transaction, an identifier of the merchant's website, and/or a payment amount, among other information.

When the analytics server 110 receives the payment request from the web server 140, the analytics server 110 may parse the request and identify the cardholder. For example, in certain embodiments, when the analytics server 110 receives the cardholder's payment information, the analytics server 110 may then query the cardholder's identification (e.g., name, identification number, and so forth) from a database 111. In certain embodiments, the authorization request may only include a unique identifier of the electronic user device 130 used to access the web merchant. An identifier, as used herein, may refer to any unique identifier allowing the analytics server 110 to identify and contact the electronic user device 130. Non-limiting examples of a unique identifier for the electronic user device 130 may include a MAC address, a telephone number, a unique identifier of an application installed on the electronic user device 130, and so forth. The analytics server 110 may then use the unique identifier included in the payment authorization to identify the payment card 150 and its corresponding unique identifier. The unique identifier may also refer to a unique identifier of the orientation tracking sensor 160 (and/or the orientation tracking module 158) of the payment card 150.

At step 192, the analytics server 110 may transmit, using the unique identifier, an instruction to the orientation tracking sensor 160 of the payment card 150 to transmit a signal corresponding to an orientation of the payment card 150. Upon identifying the orientation tracking sensor 160 associated with the payment card 150 of the cardholder, the analytics server 110 may transmit an activation signal to identify the orientation of the payment card 150. In certain embodiments, the analytics server 110 may generate and transmit an instruction to the orientation tracking sensor 160 where the instruction activates the orientation tracking sensor 160 to communicate the orientation of the payment card 150 to the analytics server 110.

In certain embodiments, after detecting the orientation of the payment card 150, the orientation tracking sensor 160 of the payment card 150 may directly transmit (e.g., using the transmitter/receiver 162 associated with the orientation tracking sensor 160) the orientation data to the analytics server 110. However, in other embodiments, the orientation tracking sensor 160 of the payment card 150 may transmit (e.g., using the transmitter/receiver 162 associated with the orientation tracking sensor 160) the orientation data to an authorized electronic user device 130 (e.g., of the cardholder) or any other electronic user device 130 in communication with the analytics server 110. For example, the orientation tracking sensor 160 of the payment card 150 may broadcast the orientation data associated with the payment card 150 and a reader associated with the cardholder's electronic user device 130 (e.g., mobile device). In certain embodiments, the orientation data may be received by an electronic user device 130 associated with the analytics server 110 but not with the cardholder. For example, another electronic user device 130 associated with another cardholder near the payment card 150 may receive the orientation data broadcasted by the orientation tracking sensor 160 of the payment card 150 and transmit (e.g., using the transmitter/receiver 162 associated with the orientation tracking sensor 160) the orientation data to the analytics server 110. Upon receiving the orientation data form the orientation tracking sensor 160 of the payment card 150, the analytics server 110 may identify the orientation of the payment card 150 associated with the payment authorization request.

At step 194, when the orientation of the payment card 150 corresponds to a first orientation, the analytics server 110 may execute a first authentication protocol. For example, if the orientation data received from the orientation tracking sensor 160 of the payment card 150 matches a predefined orientation, the analytics server 110 may authorize the transaction. In certain embodiments, the analytics server 110 may authorize the payment by transmitting an message to the web server 140 that indicates that the transaction is authorized. As such, if the analytics server 110 determines that the payment card 150 is in a predetermined orientation/position, the analytics server 110 may execute a first authentication protocol and/or cause the electronic terminal to execute the first authentication protocol.

Non-limiting examples of the orientation of the payment card 150 may include any orientation, speed, and orientation of movement, acceleration, and/or gyration of the payment card 150. For example, a predetermined orientation be consistent with a payment card 150 being placed in a user's pocket. For example, if the payment card 150 has a speed of movement that is consistent with being within a user's pocket while the user is walking, the analytics server 110 may determine that the payment card 150 does not have an orientation that is consistent with the predetermined orientation/position (e.g., consistent with the user standing or sitting relatively still, attempting to have a payment authorized). In another example, the predetermined orientation may refer to a predetermined angle of the payment card 150 (e.g., 0-90 degrees with respect to a particular axis or plane, such as true vertical or true horizontal).

In certain embodiments, the first authentication protocol may be any predetermined authentication protocol. For example, in certain embodiments, the analytics server 110 may cause (e.g., by transmitting an instruction to) the web server 140 or the electronic terminal (e.g., POS terminal) to display a prompt asking the cardholder to enter a passcode. Then, in response to receiving the passcode entered by the user via the website, if the analytics server 110 determines that the received passcode matches the passcode for the payment card 150, the analytics server 110 may then transmit a confirmation message to the web server 140 or the electronic terminal (e.g., POS terminal) indicating that the transaction is authorized.

In certain embodiments, the first authentication protocol may depend on various data received within the request (i.e., step 190). For example, in certain embodiments, the analytics server 110 may execute the first authentication protocol when the transaction exceeds a predetermined payment amount (e.g., $200). For example, in certain embodiments, when the analytics server 110 determines that the payment card 150 is in a predetermined orientation and when the payment amount is less than $200, the analytics server 110 may automatically authorize the transaction without requiring the user to enter a secondary passcode.

At step 196, when the orientation of the payment card 150 corresponds to a second orientation, the analytics server 110 may execute a second authentication protocol, wherein the second authentication protocol is more restrictive than the first authentication protocol. For example, in certain embodiments, when the analytics server 110 determines that the payment card 150 is not in the predetermined orientation, the analytics server 110 may execute a secondary authentication protocol. In certain embodiments, the analytics server 110 may cause (e.g., by transmitting an instruction to) the electronic terminal (e.g., POS terminal) to display a prompt using a passcode on the electronic user device 130. In certain embodiments, the analytics server 110 may cause (e.g., by transmitting an instruction to) one or more authorized electronic user devices 130 to display the prompt requesting a passcode. The analytics server 110 may then match the passcode entered by the user to the passcode associated with the payment card 150 to authenticate the user and authorize the transaction.

In certain embodiments, the analytics server 110 may use multi-tiered hierarchical authentication systems where different actions may trigger different levels of authentication. For example, in certain embodiments, when the analytics server 110 identifies that a user's payment card 150 is in a certain orientation/position, the analytics server 110 may execute a level I authentication method, such as asking for a four-digit pin number and/or automatically authorizing the transaction. However, when the analytics server 110 identifies that the user's payment card 150 is not in a certain orientation/position, the analytics server 110 may execute a level II authentication method, such as multifactor authentication, multichannel authentication, prompting for multiple pin numbers, prompting for additional security questions, and/or automatically denying the transaction. In such an embodiment, the level II authentication method is a more restrictive authentication than level I. In certain embodiments, the analytics server 110 may increase the restrictiveness of the authentication method in accordance with whether a payment card 150 is located near (e.g., within close proximity, such as within 10 feet, within 5 feet, within 3 feet, within 2 feet, within 1 foot, or even closer) an electronic user device 130 associated with the cardholder.

Figure 5:
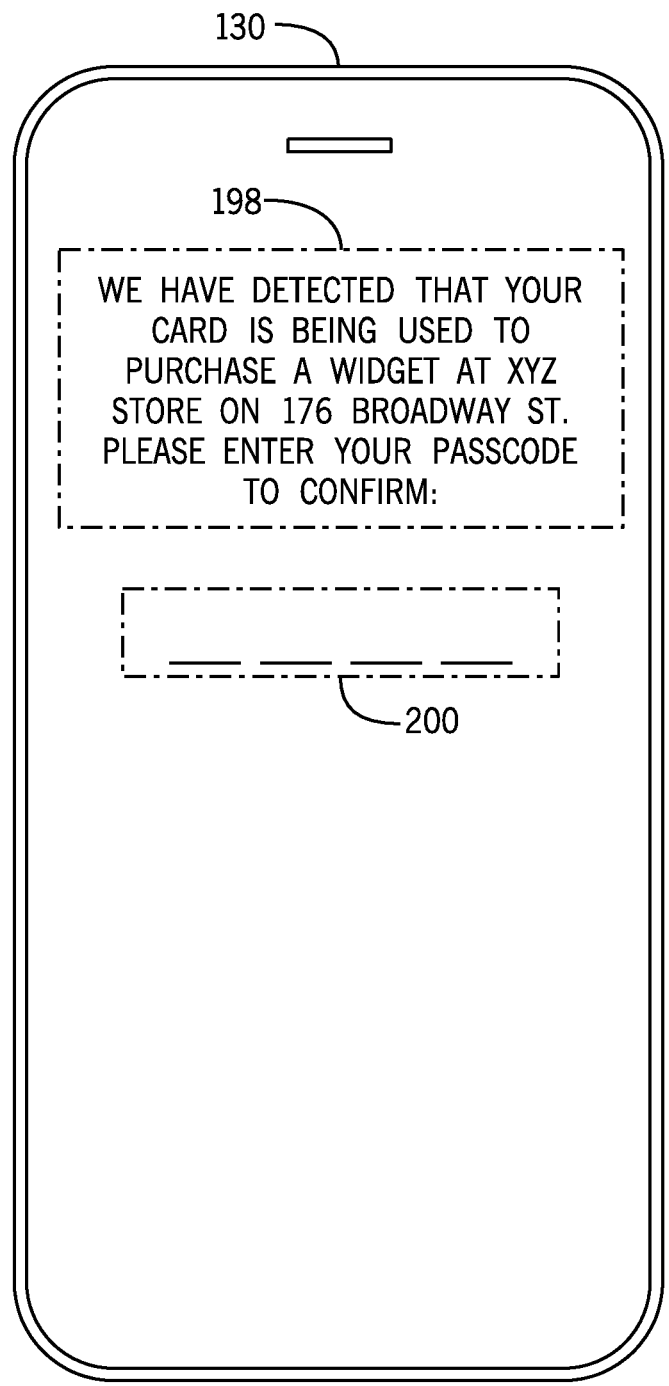
FIG. 5 illustrates a non-limiting example of secondary device authentication, in accordance with embodiments described herein.

As illustrated in FIG. 5, in certain embodiments, the analytics server 110 may cause (e.g., by transmitting an instruction to) the electronic user device 130 to display a prompt 198, which informs that the user's payment card 150 is being used for a transaction. For example, in certain embodiments, the prompt 198 may identify the payment amount ($250) and information regarding the electronic terminal (XYZ Store on 176 Broadway St.) at which the payment request was received. In certain embodiments, the analytics server 110 may also cause the electronic user device 130 to display an input element 200 allowing the user to input a passcode to approve the transaction.

In certain embodiments, the analytics server 110 may utilize a biometric module of at least one authorized electronic user device 130 and/or POS terminal to authenticate the cardholder. For example, in certain embodiments, the analytics server 110 may cause (e.g., by transmitting an instruction to) the cardholder's electronic user device 130 to display a prompt requesting the user purporting to be the cardholder to provide a biometric sample (e.g., fingerprint and/or retina scan) via an input device of the electronic user device 130. The analytics server 110 may then compare the provided biometric sample to a previously-collected biometric authentication sample to determine that the user operating the electronic user device 130 is the cardholder, and that the user has approved the transaction.

Figure 6:
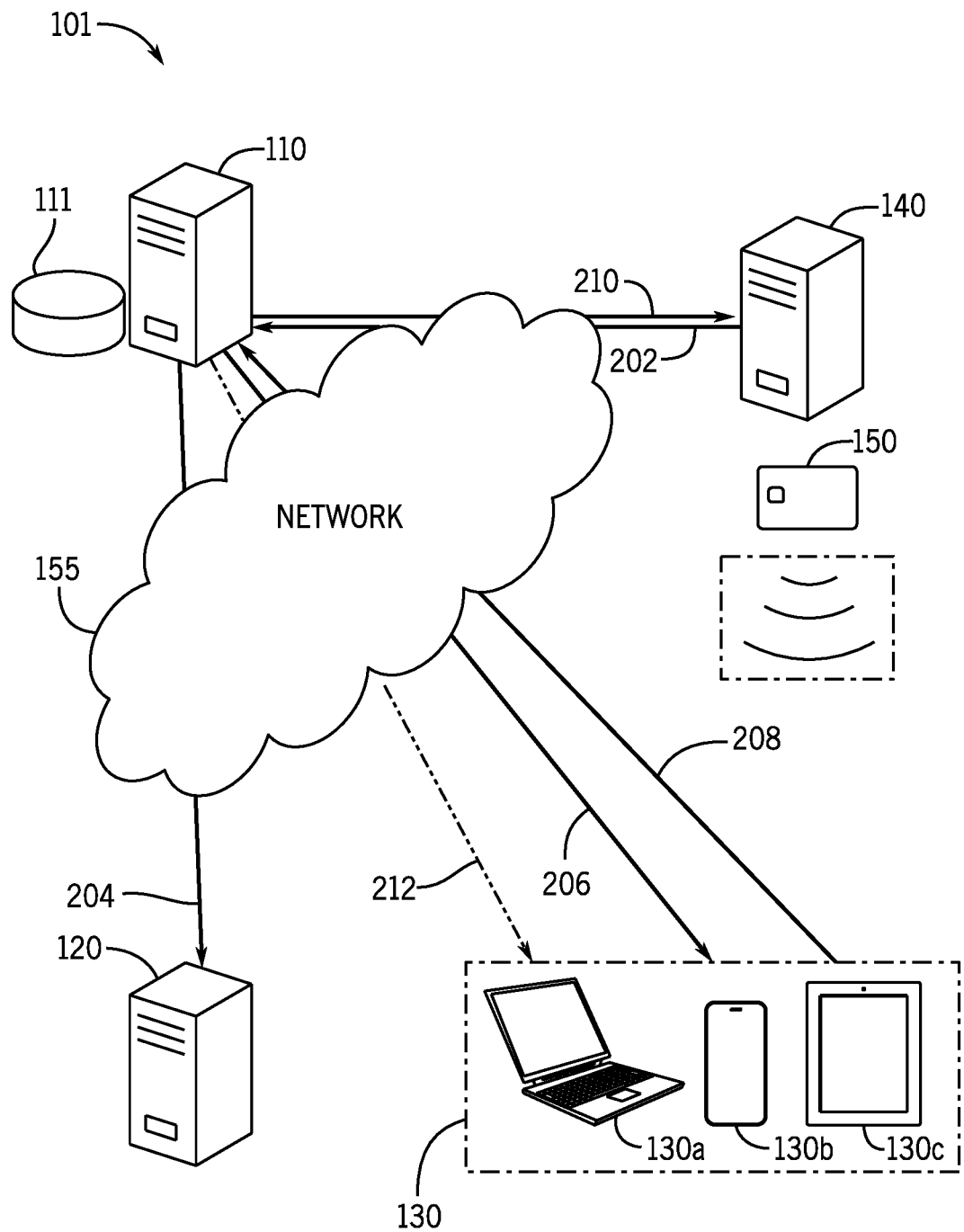
FIG. 6 illustrates a non-limiting example of operation of the systems and methods for orientation sensor-enabled authentication, in accordance with embodiments described herein.

FIG. 6 illustrates a non-limiting example of operation of a method and computer system for orientation-enabled authentication, as described in greater detail herein. The computing features illustrated in FIG. 6 are similar to those described with reference to FIG. 1. However, a few of these features (e.g., the network 155) are rearranged for ease of understanding and clarity. The systems and methods described with reference to FIG. 6 do not deviate from the systems and methods described herein.

In the embodiment of the payment system 100 illustrated in FIG. 6, a user initiates a payment request (e.g., transaction) by inputting his or her payment card 150 information into a website hosted by the web server 140. In response, the web server 140 then generates a payment authorization request 202 that includes data received from the user (e.g., data associated with the payment card 150). The web server 140 transmits the request 202 to the analytics server 110. In certain embodiments, the request 202 includes payment information associated with the payment card 150, the amount of payment to be authorized, an indication of the website visited by the cardholder, and any other relevant transaction and/or payment data (e.g., time stamp and/or location of the transition). Additionally or alternatively, in certain embodiments, the request 202 may also include a request for payment authorization (e.g., authorization to debit an account of the user) from the payment facilitation server 120.

In certain embodiments, upon receiving the request 202, the analytics server 110 may transmit a request 204 to the payment facilitation server 120. The request 204 may include the payment information received from the web server 140. For example, in certain embodiments, the request 204 may request the payment facilitation server 120 to authorize a transaction for $200 by debiting an account number that corresponds to the card number for the payment card 150.

In certain embodiments, the analytics server 110 may also use the payment information (or user information) received from the web server 140 to retrieve an identifier of an orientation tracking sensor 160 associated with the payment card 150. In certain embodiments, the analytics server 110 may then transmit a signal that activates the orientation tracking sensor 160 of the payment card 150. In response, the analytics server 110 may then directly receive orientation data from the orientation tracking sensor 160 of the payment card 150.

In certain embodiments, the analytics server 110 may instead transmit the activation signal to an electronic user device 130. In such embodiments, the orientation tracking sensor 160 of the payment card 150 may be in communication with the electronic user devices 130 (e.g., an application executing on the electronic user devices 130). For example, the analytics server 110 may transmit a request 206 to an electronic user device 130. The request 206 may cause an application executing on the electronic user device 130 (and in communication with the orientation tracking sensor 160 of the payment card 150) to identify an orientation of the payment card 150, which may be transmitted to the analytics server 110 by the electronic user device 130 as a confirmation 208, in certain embodiments.

Upon receiving orientation data from the orientation tracking sensor 160 of the payment card 150 (e.g., either directly from the payment card 150 or indirectly via the electronic user device 130), the analytics server 110 may determine whether the orientation data is consistent with a predetermined orientation. For example, in certain embodiments, the analytics server 110 may identify that the payment card 150 has an orientation consistent with being in a user's pocket or having an orientation that is consistent with movements of a user's body (e.g., while the user is walking), neither of which is consistent with the predetermined orientation that is consistent with an authorized orientation. For example, in certain embodiments, the analytics server 110 may determine that the payment card 150 has a "flat" orientation consistent with being laid flat on a table or other surface, which is consistent with a predetermined, authorized orientation.

If the orientation data of the payment card 150 is consistent with a predetermined orientation, the analytics server 110 may transmit a confirmation 210 to the web server 140 causing the web server 140 to facilitate the transaction (e.g., the payment is authorized). In certain embodiments, the analytics server 110 may only authorize the transaction if the conditions described above are satisfied and the payment facilitation server 120 further confirms that the user's account has sufficient funds.

In certain embodiments, the analytics server 110 may utilize an additional layer of security before authorizing the transaction. For example, in certain embodiments, the analytics server 110 may send an authentication request 212 to the electronic user devices 130 requesting the user to enter a passcode. In certain embodiments, the analytics server 110 may utilize this two-factor multi-channel authentication method before transmitting the confirmation 210 to the web server 140. As illustrated herein, the authentication request 212 is depicted in dashed lines, which represents that the two-factor authentication may be optional. For example, in certain embodiments, the analytics server 110 may only utilize the two-factor authentication method described herein for transactions satisfying a predetermined condition (e.g., satisfying a payment amount threshold).

In a non-limiting example, a user initiates a transaction at a POS terminal. In such embodiments, the POS terminal may retrieve the user's payment card information including, for example, a payment card number, an expiration date, and a CVV, among other information. In certain embodiments, a server of the POS terminal may then transmit an authorization request 202 to the analytics server 110. In certain embodiments, the authorization request 202 may include the user's payment card number, expiration date, and CVV, among other information. In certain embodiments, the authorization request 202 may also include an amount of the transaction (e.g., payment amount), identification information of the POS terminal, and a timestamp of the transaction, among other information.

Upon receiving the authorization request 202, the analytics server 110 may query a database 11 using at least one of the payment card number, CVV, and the expiration date to identify the user associated with the payment card 150. In certain embodiments, upon identifying the user associated with the payment card 150, the analytics server 110 may then retrieve a list of authorized electronic user devices 130 operated by the user. For example, in certain embodiments, the analytics server 110 may identify a mobile phone and a personal computer operated by the user as the authorized electronic user devices 130 that have been previously designated as authorized by the user.

As described in greater detail herein, the user's mobile phone and personal computer (among other authorized electronic user devices 130) may be enabled with an application that can communicate with an orientation tracking sensor 160 of the user's payment card 150. Accordingly, the analytics server 110 may transmit an instruction to the user's mobile phone and personal computer (among other authorized electronic user devices 130) to activate an orientation tracking sensor 160 of the user's payment card 150. As a result, the user's mobile device/computer may capture orientation data associated with the user's payment card 150 and transmit the orientation data to the analytics server 110.

If the analytics server 110 determines that the orientation data of the payment card 150 is consistent with a predetermined orientation, the analytics server 110 may automatically authorize the transaction and send an authorization confirmation message to the server of the POS terminal. In other embodiments, the analytics server 110 may execute a lower-level authentication protocol. For example, in certain embodiments, the analytics server 110 may only ask for a four-digit passcode.

In contrast, if the analytics server 110 determines that the orientation data of the payment card 150 is not consistent with the predetermined orientation, the analytics server 110 may execute a higher-level authentication protocol. For example, in certain embodiments, the analytics server 110 may send an instruction to display a prompt to at least one of user's authorized electronic user devices 130 requesting the user to enter a passcode (e.g., higher number of digits than the lower level authentication, in certain embodiments).

In certain embodiments, the selection of the lower or higher level of authentication protocol may also depend on other transaction data. For example, in certain embodiments, the analytics server 110 may execute a lower level authentication protocol for transactions that entail less than a predetermined payment amount. In other embodiments, the analytics server 110 may execute a higher-level authentication protocol when the transaction amount is higher than a predetermined threshold.

In a non-limiting example, the analytics server identifies that the user's card has an orientation and a speed of movement consistent with being in a pocket while the person is walking, which is not consistent with the card being used at a POS terminal. As a result, in certain embodiments, the analytics server 110 may transmit an instruction to display a secondary authentication prompt to an authorized electronic user device 130 associated with the payment card 150.

As described in greater detail herein, the systems and methods described herein are applicable to any electronic transactions. For example, the systems and methods described herein may be applied to any payment card 150 that is being virtually used (e.g., on an online shopping website) to facilitate a transaction online. The systems and methods described herein are particularly advantageous because they may be retroactively applied to existing payment systems. For example, the systems and methods described herein may be provided as an additional security layer to assistant payment systems, such as credit/debit card issuer systems. In certain embodiments, the orientation tracking sensor 160 (and associated transmitter/receiver 162, in certain embodiments) may be retroactively installed on any payment card 150 already in use. In addition, in certain embodiments, the application executing on the user's electronic user device 130 and in communication with the orientation tracking sensor 160 may be retroactively installed on any electronic user device 130 owned and operated by the user. Therefore, the systems and methods described herein may be implemented as an additional security layer in existing payment systems, and may be provided without interrupting the existing payment systems. Furthermore, the systems and methods described herein do not interfere with existing cybersecurity or authentication protocols. For example, a card issuer or payment facilitation server may still execute an existing authentication protocol, and the systems and methods described herein may be used as a supplemental authentication method.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware and/or software depends upon the particular application and design constraints imposed on the overall system. Skilled artisans may implement the described functionality in varying ways for each particular application, but such implementation decisions should not be interpreted as causing a departure from the scope of the principles of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code and/or specialized control hardware used to implement these systems and methods is not limiting. Thus, the operation and behavior of the systems and methods were described without reference to the specific software code being understood that software and control hardware may be designed to implement the systems and methods based on the description herein.

When implemented in software, the functions may be stored as one or more instructions or code on at least one non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of a non-limiting example, such non-transitory processor-readable media may include RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the components described herein should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

While only certain features of the disclosure have been illustrated and described herein, many modifications and changes will occur to those skilled in the art. For example, while the embodiments described herein include a specific logic organization for data structures and libraries, such as smart contracts and APIs, substantially similar benefits provided by the present invention may be obtained by trivial structural alterations such as changes in name or in non-substantial changes to the mode of operation of the data structures. It is, thus, to be understood that the appended claims are intended to cover all such modifications and changes as fall within the true spirit of the invention.

The invention claimed is:

1. A method, comprising:
 receiving, via a server, a request to authorize a payment associated with a payment card;
 transmitting, via the server, an instruction to an orientation tracking module of the payment card to determine an orientation of the payment card and to transmit a signal corresponding to the determined orientation to the server;
 receiving, via the server, the determined orientation of the payment card from the orientation tracking module of the payment card;
 executing, via the server, a first authentication protocol when the determined orientation of the payment card corresponds to a first orientation, wherein the first authentication protocol defines a first additional procedure to authorize the payment; and
 executing, via the server, a second authentication protocol when the determined orientation of the payment card corresponds to a second orientation, wherein the second authentication protocol defines a second additional procedure to authorize the payment.

2. The method of claim 1, comprising:
 identifying, via the server, an authorized electronic device associated with the payment card;
 transmitting, via the server, an instruction to the authorized electronic device to display a prompt requesting an authentication input;
 receiving, via the server, the authentication input from the authorized electronic device; and
 authorizing, via the server, the payment in response to matching the authentication input with a predetermined authentication input associated with the payment card.

3. The method of claim 2, comprising transmitting, via the server, a notification to the authorized electronic device, the notification comprising at least one of a payment amount, identification information associated with a web server or point of sale (POS) terminal from which the request originated, and a timestamp of the request.

4. The method of claim 2, wherein the authorized electronic device is at least one of a mobile phone, computer, and wearable device.

5. The method of claim 1, comprising receiving, via the server, the request to authorize the payment associated with a payment card from a web server hosting a webpage associated with an online merchant.

6. The method of claim 1, comprising receiving, via the server, the request to authorize the payment associated with a payment card from a point of sale (POS) terminal.

7. The method of claim 1, comprising:
 identifying, via the server, a unique identifier associated with the orientation tracking module of the payment card; and
 transmitting, via the server, the instruction to the orientation tracking module of the payment card to determine the orientation of the payment card and to transmit the signal corresponding to the determined orientation to the server based on the unique identifier.

8. The method of claim 1, comprising transmitting, via the server, an authorization request to a payment facilitation server, wherein execution of the first authentication protocol or the second authentication protocol is dependent upon whether the payment facilitation server approves the authorization request.

9. The method of claim 1, comprising:
 receiving, via the server, at least one of a speed of movement, a direction of movement, an acceleration of movement, and a gyration associated with the payment card from the orientation tracking module of the payment card; and
 executing, via the server, the first authentication protocol or the second authentication protocol based on the at least one of the speed of movement, the direction of movement, the acceleration of movement, and the gyration associated with the payment card.

10. The method of claim 1, wherein the payment card comprises an orientation tracking sensor and a transmitter/receiver integrated into the payment card, wherein the orientation tracking sensor is configured to detect the orientation of the payment card and the transmitter/receiver is configured to transmit the signal corresponding to the determined orientation to the server.

11. A server comprising at least one processor configured to execute processor-executable instructions stored on at least one non-transitory machine-readable storage medium of the server, wherein the processor-executable instructions, when executed by the at least one processor, cause the server to:
- receive a request to authorize a payment associated with a payment card;
- transmit an instruction to an orientation tracking module of the payment card to determine an orientation of the payment card and to transmit a signal corresponding to the determined orientation to the server;
- receive the determined orientation of the payment card from the orientation tracking module of the payment card;
- execute a first authentication protocol when the determined orientation of the payment card corresponds to a first orientation, wherein the first authentication protocol defines a first additional procedure to authorize the payment; and
- execute a second authentication protocol when the determined orientation of the payment card corresponds to a second orientation, wherein the second authentication protocol defines a second additional procedure to authorize the payment.

12. The server of claim 11, wherein the processor-executable instructions, when executed by the at least one processor, cause the server to:
- identify an authorized electronic device associated with the payment card;
- transmit an instruction to the authorized electronic device to display a prompt requesting an authentication input;
- receive the authentication input from the authorized electronic device; and
- authorize the payment in response to matching the authentication input with a predetermined authentication input associated with the payment card.

13. The server of claim 12, wherein the processor-executable instructions, when executed by the at least one processor, cause the server to transmit a notification to the authorized electronic device, the notification comprising at least one of a payment amount, identification information associated with a web server or point of sale (POS) terminal from which the request originated, and a timestamp of the request.

14. The server of claim 12, wherein the authorized electronic device is at least one of a mobile phone, computer, and wearable device.

15. The server of claim 12, wherein the payment card comprises an orientation tracking sensor and a transmitter/receiver integrated into the payment card, wherein the orientation tracking sensor is configured to detect the orientation of the payment card and the transmitter/receiver is configured to transmit the signal corresponding to the determined orientation to the server.

16. The server of claim 11, wherein the processor-executable instructions, when executed by the at least one processor, cause the server to receive the request to authorize the payment associated with a payment card from a web server hosting a webpage associated with an online merchant.

17. The server of claim 11, wherein the processor-executable instructions, when executed by the at least one processor, cause the server to receive the request to authorize the payment associated with a payment card from a point of sale (POS) terminal.

18. The server of claim 11, wherein the processor-executable instructions, when executed by the at least one processor, cause the server to:
- identify a unique identifier associated with the orientation tracking module of the payment card; and
- transmit the instruction to the orientation tracking module of the payment card to determine the orientation of the payment card and to transmit the signal corresponding to the determined orientation to the server based on the unique identifier.

19. The server of claim 11, wherein the processor-executable instructions, when executed by the at least one processor, cause the server to transmit an authorization request to a payment facilitation server, wherein execution of the first authentication protocol or the second authentication protocol is dependent upon whether the payment facilitation server approves the authorization request.

20. The server of claim 11, wherein the processor-executable instructions, when executed by the at least one processor, cause the server to:
- receive at least one of a speed of movement, a direction of movement, an acceleration of movement, and a gyration associated with the payment card from the orientation tracking module of the payment card; and
- execute the first authentication protocol or the second authentication protocol based on the at least one of the speed of movement, the direction of movement, the acceleration of movement, and the gyration associated with the payment card.

* * * * *